United States Patent [19]

Yoshimura et al.

[11] Patent Number: 4,889,989
[45] Date of Patent: Dec. 26, 1989

[54] CASSETTE FOR IMAGE INFORMATION RECORDING CARRIER, MECHANISM FOR REMOVING IMAGE INFORMATION RECORDING CARRIER FROM THE CASSETTE, AND APPARATUS FOR READING IMAGE INFORMATION

[75] Inventors: Ryoichi Yoshimura; Shumpeita Torii; Naoto Yamada, all of Kanagawa, Japan

[73] Assignee: Fuji Photo Film Co., Ltd., Kanagawa, Japan

[21] Appl. No.: 920,331

[22] Filed: Oct. 17, 1986

[30] Foreign Application Priority Data

| Oct. 17, 1985 [JP] | Japan | 60-232031 |
| Oct. 19, 1985 [JP] | Japan | 60-234183 |
| Oct. 19, 1985 [JP] | Japan | 60-234185 |
| Oct. 19, 1985 [JP] | Japan | 60-160165[U] |

[51] Int. Cl.$^4$ .......................................... G01N 23/04
[52] U.S. Cl. ........................... 250/327.2; 250/484.1; 378/182; 378/188; 414/411
[58] Field of Search .............. 378/181, 182, 172, 173, 378/188; 250/327.2, 484.1; 354/276; 414/411

[56] References Cited

U.S. PATENT DOCUMENTS

| 1,059,488 | 4/1913 | Rosenthal | 378/172 |
| 3,504,180 | 3/1970 | Tone | 378/188 |
| 4,163,499 | 8/1979 | Schmidt | 414/411 |
| 4,537,307 | 8/1985 | Tamura | 354/276 |
| 4,578,582 | 3/1986 | Takano | 250/327.2 J |
| 4,701,617 | 10/1987 | Utsumi | 250/484.1 B |

FOREIGN PATENT DOCUMENTS

| 18564 | 4/1980 | European Pat. Off. |
| 79557 | 11/1982 | European Pat. Off. |
| 115802 | 1/1984 | European Pat. Off. |
| 137674 | 4/1985 | European Pat. Off. |
| 179418 | 10/1985 | European Pat. Off. |
| 2438278 | 2/1975 | Fed. Rep. of Germany |

Primary Examiner—Carolyn E. Fields
Attorney, Agent, or Firm—Sughrue, Mion, Zinn, Macpeak & Seas

[57] ABSTRACT

A cassette for storing an image recording carrier such as a stimulable phosphor sheet has a casing for holding the image recording carrier therein under light-shielding conditions, and at least one lid member mounted on one end of the casing and openable and closable under a pressure applied thereto. The casing with said one end directed vertically downwardly is loaded through a cassette insertion slot into an apparatus for processing the image recording carrier. When the casing is introduced in the apparatus, the lid member is forcibly opened for allowing the image recording carrier to be delivered by gravity out of the casing.

14 Claims, 12 Drawing Sheets

CASSETTE FOR IMAGE INFORMATION RECORDING CARRIER, MECHANISM FOR REMOVING IMAGE INFORMATION RECORDING CARRIER FROM THE CASSETTE, AND APPARATUS FOR READING IMAGE INFORMATION

BACKGROUND OF THE INVENTION

The present invention relates to a cassette for an image information recording carrier, a mechanism for removing an image information recording carrier from the cassette, and an apparatus for reading image information, and more particularly to a cassette for storing an image information carrier such as a stimulable phosphor sheet or an X-ray film, for example, under light-shielding conditions, an image information carrier removing mechanism, and an information image apparatus in which the cassette is vertically inserted and opened at its leading end to define an opening, from which an image recording carrier falls by gravity into an image readout mechanism.

There has recently been developed and widely used especially in the medical field a radiation image recording and reproducing system for producing the radiation-transmitted image of an object using a stimulable phosphor material capable of emitting light upon exposure to stimulating rays. When a stimulable phosphor is exposed to a radiation such as X-rays, α-rays, β-rays, γ-rays, cathode rays, or ultraviolet rays, the phosphor stores a part of the energy of the radiation. When the phosphor exposed to the radiation is subsequently exposed to stimulating rays such as visible light, the phosphor emits light in proportion to the stored energy of the radiation.

In the radiation image recording and reproducing system employing such a stimulable phosphor, the radiation image information of an object such as a human body is stored in a sheet having a layer of stimulable phosphor, and then the stimulable phosphor sheet is scanned with stimulating rays to cause the stimulable phosphor sheet to emit light representative of the radiation image. The emitted light is then photoelectrically detected to produce an image signal that is electrically processed for generating image information which is recorded on a recording medium such as a photosensitive material or displayed as a visible image on a CRT or the like. The construction and operation of an apparatus for reading radiation image information recorded on a stimulable phosphor sheet will be described by way of example with reference to FIG. 1 of the accompanying drawings.

Figure 1:
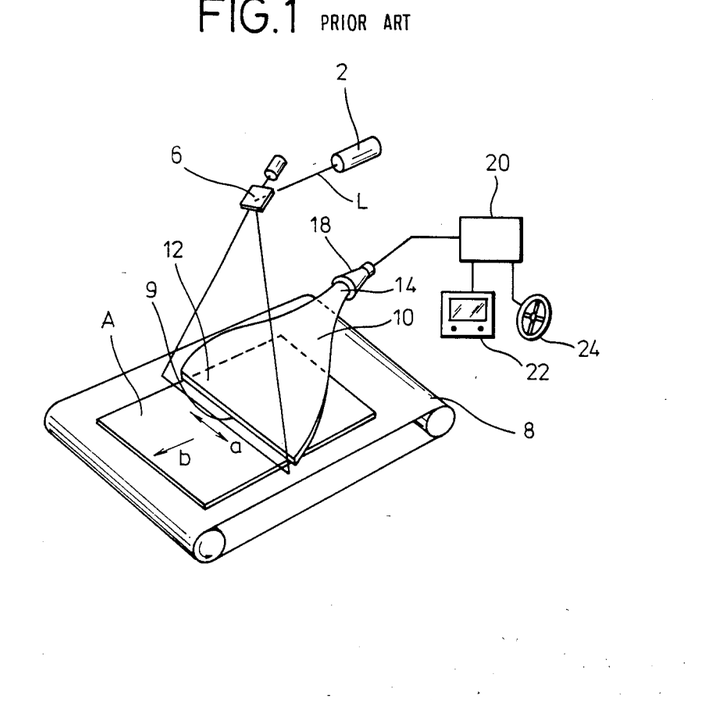
FIG. 1 is a schematic perspective view of a conventional image readout apparatus employing a stimulable phosphor sheet.

A laser beam L of constant intensity emitted from a laser source 2 is applied to a galvanometer mirror 6, which reflects the laser beam L toward a stimulable phosphor sheet A positioned below the galvanometer mirror 6 and which deflects the laser beam L to scan the stimulable phosphor sheet A in a transverse direction or main scanning direction indicated by the arrow a. The stimulable phosphor sheet A is held in position on an endless belt 8 under vacuum that is developed by a vacuum suction device (not shown) placed between the upper and lower runs of in the endless belt 8 and that acts on the stimulable phosphor sheet A through a multiplicity of holes defined in the endless belt 8. At the same time that the stimulable phosphor sheet A is scanned in the main scanning direction, it is fed in a direction (indicated by the arrow b) substantially normal to the main scanning direction, so that the stimulable phosphor sheet A is also scanned in a subscanning direction indicated by the arrow b. Therefore, the stimulable phosphor sheet A is two-dimensionally scanned over its entire surface by the laser beam L. As the stimulable phosphor sheet A is thus scanned by the laser beam L, it emits light in proportion to image information recorded thereon, and the emitted light enters a transparent light guide 10 through an entrance end 9 disposed adjacent to the stimulable phosphor sheet A and extending parallel to the main scanning direction. The light guide 10 is progressively shaped into a cylindrical form from a flat front end 12 near the stimulable phosphor sheet A toward a substantially cylindrical opposite rear end 14 which is coupled to a photomultiplier 18. The light which has entered the entrance end 9 is collected into the rear end 14 and then applied through a filter (not shown) to the photomultiplier 18. The photomultiplier 18 converts the emitted light into an electric signal, which is supplied to and electrically processed by an image signal readout circuit 20. The processed signal is applied to a CRT 22 which displays the signal as a visible image, or is recorded on a magnetic tape 24, or may be recorded as a hard copy directly on a photographic photosensitive material.

It has been the conventional practice to store the stimulable phosphor sheet A in a cassette, and a desired radiation image is recorded on the sheet A by application of radiation to the sheet A through the cassette. Thereafter, the sheet A stored in the cassette is placed in the radiation image information readout apparatus, and taken out of the cassette for reading the recorded image therefrom.

The conventional image readout apparatus has employed a sheet removal means including a suction cup serving as a vacuum suction device for removing the sheet from the cassette and delivering the removed sheet to the image readout unit. The image readout apparatus requires a displacement mechanism for displacing the suction cup and also a control system for controlling the displacement mechanism to displace the suction cup along a desired path. The displacement mechanism is complex, and a delivery system must be provided for introducing the sheet into the image readout unit in a direction suitable for the image readout unit to read the recorded image. Therefore, the overall image readout apparatus has inevitably been large in size. The large image readout apparatus takes up a relatively large space in a facility such as a hospital which needs effective utilization of a small space available. The sheet removal means requires frequent inspection and maintenance.

In a conventional system using an X-ray film to record a radiation image, an unexposed X-ray film is stored in a cassette under light-shielding conditions. Radiation is applied to the X-ray film stored in the cassette to record the desired radiation image on the X-ray film. Subsequently, the X-ray film stored in the cassette is loaded into an automatic image developing machine, in which the X-ray film is removed from the cassette and the image is then developed. Like the aforesaid image readout apparatus, the automatic image developing machine employs a sheet removal means including a suction cup for taking the X-ray film out of the cassette. Consequently, the mechanism associated with the sheet removal means in the automatic image developing machine is complex and highly costly, and the automatic image developing machine is rendered large in size.

SUMMARY OF THE INVENTION

It is an object of the present invention to provide a cassette for storing an image recording carrier, which is simple in structure, and an apparatus for processing an image recording carrier such as a stimulable phosphor sheet or an X-ray film which is stored in such a cassette, the apparatus having a simple mechanism for removing the image recording carrier from the cassette and a simple delivery system constituting an image readout unit and disposed in a housing.

Another object of the present invention is to provide a cassette for storing an image recording carrier, comprising a casing for holding the image recording carrier therein under light-shielding conditions, and at least one lid member mounted on one end of the casing and openable and closable under a pressure applied thereto, the arrangement being such that the casing with said one end directed vertically downwardly will be loaded through a cassette insertion slot into an apparatus for processing the image recording carrier, to cause the lid member to be forcibly opened for allowing the image recording carrier to be delivered out of the casing.

Still another object of the present invention is to provide a cassette for storing an image recording carrier, comprising a casing for holding the image recording carrier, the casing having a pair of wide side walls defining therebetween an opening for delivering the image recording carrier therethrough into an apparatus for processing the image recording carrier, and a plate extending from one of the side walls to the other side wall for normally closing the opening to keep the image recording carrier in the casing under the light-shielding conditions, the arrangement being such that a portion of the plate can be pushed by a member outside of the casing, thereby to open the opening to deliver the image recording carrier out of the casing through the opening.

A still further object of the present invention is to provide a mechanism for removing an image information carrier from a cassette, comprising means defining an opening for vertically downwardly receiving a casing with the image recording carrier stored therein under light-shielding conditions, the casing having a lid member, and lid-opening means disposed in a lower portion of the opening for forcibly opening the lid member to allow the image recording carrier to be delivered out of the casing.

A yet still further object of the present invention is to provide an apparatus for reading an image from a stimulable phosphor sheet, comprising an image readout unit for reading radiation image information recorded on the stimulable phosphor sheet, an erase unit for erasing a remaining radiation image on the stimulable phosphor sheet after the radiation image information has been read therefrom, a cassette holder for detachably holding a cassette with the stimulable phosphor sheet stored therein, the cassette having an openable and closable end, the cassette holder allowing the stimulable phosphor sheet to fall by gravity from the cassette when the end of the cassette is opened, and sheet conveyor means for receiving the stimulable phosphor sheet that has fallen from the cassette and delivering the stimulable phosphor sheet to the image readout unit and the erase unit.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Cassettes for storing image information carriers according to various embodiments of the present invention will be described in relation to an image information readout apparatus with reference to FIG. 2 and following.

Figure 2:
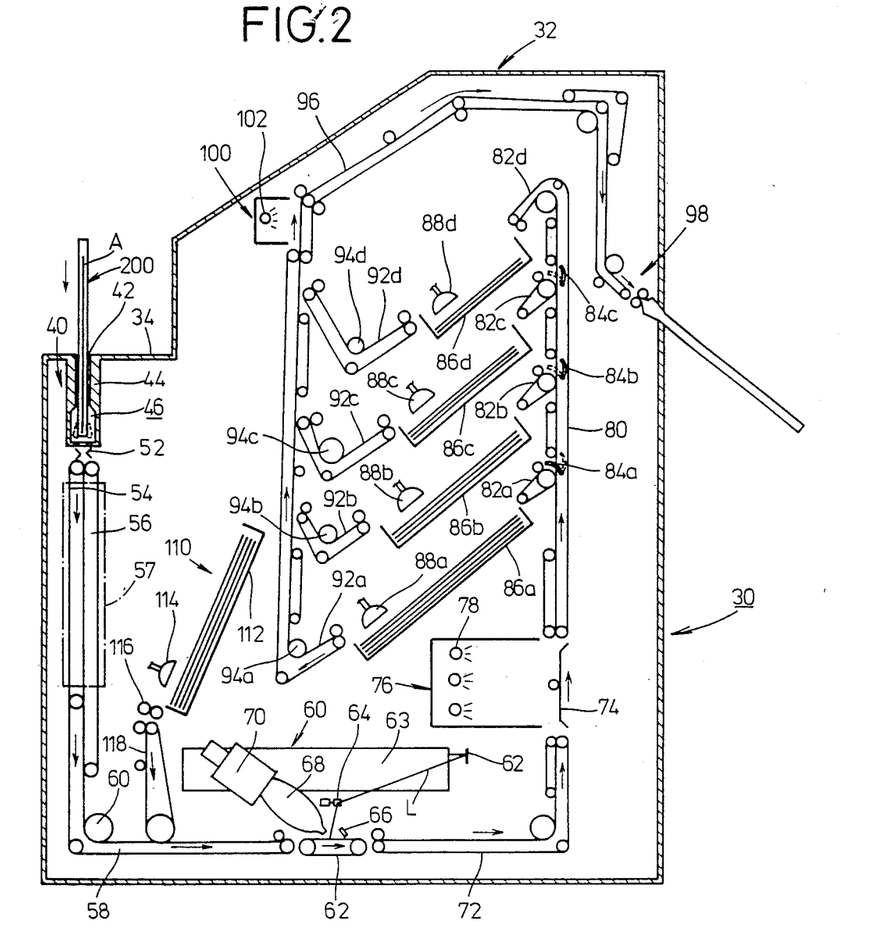
FIG. 2 is a schematic vertical cross-sectional view of a radiation image information readout apparatus according to the present invention.

FIG. 2 shows an image readout apparatus 30 according to the present invention, the apparatus 30 including a housing 32. The housing 32 has a front, horizontally flat portion 34 including a cassette holder 40 extending in the housing 32, the cassette holder 40 constituting a mechanism for removing an image information carrier from a cassette, as described below. The cassette holder 40 includes a cassette support base 44 having a cassette insertion slot 42, the cassette support base 44 being preferably formed as a unitary structure of synthetic resin. The cassette insertion slot 42 extends downwardly from the flat portion 34 and communicates with a space 46 defined in the cassette support base 44.

The space 46 is wider than the cassette insertion slot 42 and has a bottom including a pair of tapered surfaces 48a, 48b (FIG. 4) slanted upwardly from the opposite edges to the center of the bottom. The bottom of the space 46 has a vertical slit 50 (FIGS. 3 and 4) extending downwardly from the joint between the tapered surfaces 48a, 48b for discharging a stimulable phosphor sheet A into the housing 32. A pair of bent guide plates 52 (FIG. 4) is disposed below the cassette support base 44, the guide plates 52 converging toward each other at a position underneath the slit 50. The guide plates 52 are positioned closely to belt conveyors 54, 56 (FIG. 2) which are held in contact with each other. Preferably, a stacker 57 is disposed in association with the belt conveyors 54, 56 for temporarily holding the stimulable phosphor sheet A in preparation for delivery to an image readout unit (described below).

As illustrated in FIG. 2, the belt conveyors 54, 56 are followed by a bent belt conveyor 58 with which a portion of the belt conveyor 56 is held in contact. The belt conveyor 58 is bent by a large-diameter roller 60 contacting the same. The belt conveyor 58 is disposed at the bottom of the housing 32 and has a horizontal portion extending into the image readout unit, designated at 60. More specifically, a subscanning belt conveyor 62 with a vacuum suction mechanism (not shown) incorporated therein is disposed at the leading end of the belt conveyor 58. A light source 63 for generating a laser beam L is positioned above the belt conveyor 62. The laser beam L emitted from the light source 63 is reflected by a mirror 62 toward a light deflector 64 comprising a galvanometer mirror, for example, which rotates at a high speed. A reflecting mirror 66 is disposed below the light deflector 64. The reflecting mirror 66 is positioned opposite to a light guide 68 coupled to a photomultiplier 70.

The belt conveyor 62 is followed by a bent belt conveyor 72 for delivering the stimulable phosphor sheet A from which the recorded image has been read. The belt conveyor 72 includes a vertical portion with its leading end followed by a vertical guide 74 extending in confronting relation to an erase unit 76. The erase unit 76 has a plurality of erasure light sources 78 such as fluorescent lamps, sodium-vapor lamps, xenon lamps, or iodine lamps. Upwardly from the guide 74, there extends a belt conveyor 80 including a leading end 82d bent obliquely downwardly. Belt conveyors 82a, 82b, 82c are disposed at equal intervals along the belt conveyor 80 and are inclined at the same angle, the bent leading end 82d of the belt conveyor 80 being inclined at the same angle as that of the belt conveyors 82a, 82b, 82c. Guide plates 84a, 84b, 84c are angularly movably disposed between the belt conveyor 80 and the belt conveyors 82a, 82b, 82c, respectively. The stimulable phosphor sheet A delivered by the belt conveyor 80 is guided toward the belt conveyor 82a, 82b, or 82c by angular movement of the guide plate 84a, 84b, or 84c.

Trays 86a, 86b, 86c, 86d are obliquely disposed below the distal ends of the belt conveyors 82a, 82b, 82c and the bent leading end 82d for storing stimulable phosphor sheets A of respective sizes which have been delivered by the belt conveyor 80. Suction cups 88a through 88d are disposed respective above the trays 86a through 88d, the suction cups 88a through 88d constituting respective vacuum suction mechanisms (not shown). The tray 86a is associated with a bent end 92a of a belt conveyor 90, and the trays 86b through 86d are associated respectively with bent belt conveyors 92b, 92c, 92d. The end 92a of the belt conveyor 90 is bent by a roller 94a, and the belt conveyors 92b through 92d are bent by respective rollers 94b, 94c, 94d. The belt conveyor 90 has an upper end near a belt conveyor 96 which has many bends and a leading end extending into a loading unit 98. The upper end of the belt conveyor 90 is positioned closely to an auxiliary erase unit 100 having an erasure light source 102 that is the same as the light source 78 of the erase unit 76.

The loading unit 98 is arranged to hold an employ cassette, as described later on.

An image recording apparatus for recording a radiation image on a stimulable phosphor sheet A can record a radiation image on a single stimulable phosphor sheet A stored in a cassette, and also can successively record radiation images on stimulable phosphor sheets A which have been stored in and removed one by one from a sheet supply cassette. The stimulable phosphor sheets A on which the image have been recorded are successively stored in a sheet storage magazine, which is then delivered into the image readout apparatus for reading the recorded image information from the stimulable phosphor sheets A.

The image readout apparatus 30 has a mechanism for loading a magazine storing a plurality of stimulable phosphor sheets A with images recorded thereon and for successively delivering the stimulable phosphor sheets A from the magazine into the image readout unit 60. More specifically, a sheet storage magazine holder 110 includes an inclined tray 112, and a suction cup 114 constituting a vacuum suction mechanism (not shown) is movably positioned adjacent to a lower portion of the tray 112. The suction cup 114 is located above a pair of rollers 116 and a belt conveyor 118 having an upper end disposed closely to the rollers 116 and a lower end to the belt conveyor 58. A stimulable phosphor sheet A taken out of the tray 112 by the suction cup 114 is fed by the rollers 116 and the belt conveyor 118 onto the belt conveyor 58.

Figure 3:
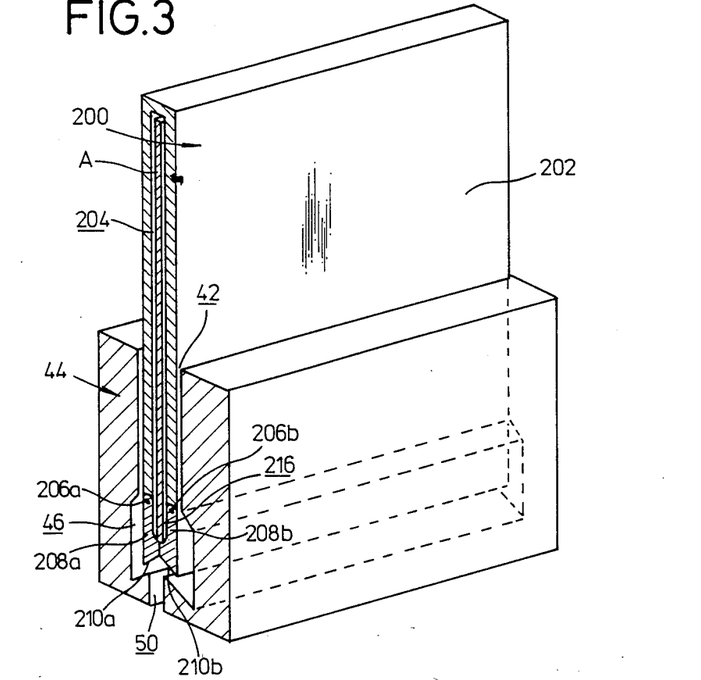
FIG. 3 is a perspective view, partly cut away, of a cassette according to the present invention, the cassette being loaded in a cassette support base in the radiation image information readout apparatus.
Figure 4:
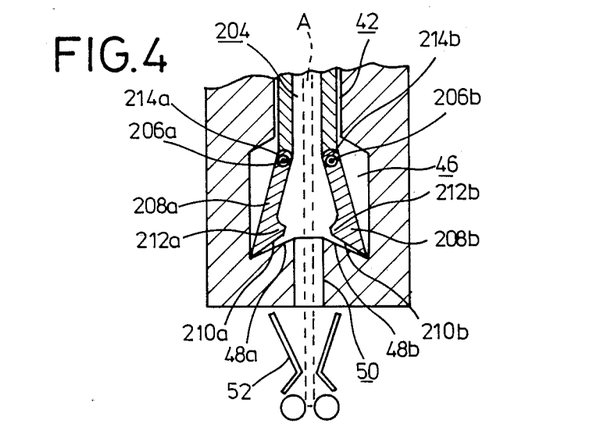
FIG. 4 is a fragmentary vertical cross-sectional view of the cassette and the cassette support base, with the cassette being open.

A cassette for storing a stimulable phosphor sheet which is to be loaded in the cassette holder 40 will be described below with reference to FIGS. 3 through 5.

A cassette 200 for storing a stimulable phosphor sheet includes a casing 202 in the form of a rectangular parallelepiped made of hard synthetic resin. The casing 202 has a space 204 defined therein and having a width larger than the thickness of the stimulable phosphor sheet A. Two first lid members 208a, 208b are angularly movably mounted by respective pins 206a, 206b on the lower end of the casing 202 for normally closing the lower opening of the space 204 in the casing 202. As shown in FIGS. 3 and 4, the lid members 208a, 208b have on distal ends thereof respective tapered surfaces 210a, 210b extending inwardly and upwardly in face-to-face relation to the tapered surfaces 48a, 48b of the cassette support base 44. The tapered surfaces 210a, 210b have projecting ends 212a, 212b, respectively, which are brought into close contact with each other to prevent light from entering the space 204 when the lid members 208a, 208b are closed. The lid members 208a, 208b are normally urged toward each other by coil springs 214a, 214b disposed around the pins 206a, 206b, respectively. The lids members 208a, 208b have a space 216 which will be defined when the ends 212a, 212b are closed.

Operation of the cassette 200 and the image readout apparatus 30 will be described below.

A radiation image is recorded on the stimulable phosphor sheet A by exposing the sheet A to image-bearing radiation through the cassette 200 in a radiation image recording apparatus (not shown). Then, the cassette 200 is loaded into the image readout apparatus 30 for reading the recorded image therefrom. More specifically, the cassette 200 is inserted into the cassette holder 40 through the cassette insertion slot 42 in a downward direction normal to the horizontally flat portion 34, as indicated by the arrow in FIG. 2. During this time, the lid members 208a, 208b are held in pressed contact with each other under the resiliency of the coil springs 214a, 214b to keep the stimulable phosphor sheet within the cassette 200 under light-shielding conditions.

The cassette 200 is inserted until its distal end reaches the space 46 and the tapered surfaces 210a, 210b of the lid members 208a, 208b engage the tapered surfaces 48a, 48b of the cassette holder 40. Upon further depression of the cassette 200, the tapered surfaces 210a, 210b are spread apart from each other by the tapered surfaces 48a, 48b, respectively, against the resiliency of the coil springs 214a, 214b, whereupon the space 216 communicates with the slit 50. Then, the stimulable phosphor sheet A is delivered by gravity from the cassette 200 past the lid members 208a, 208b through the slit 50 to the guide plates 52.

The stimulable phosphor sheet A as it moves past the guide plates 52 is gripped by the belt conveyors 54, 56 disposed below the guide plates 52. If a preceeding stimulable phosphor sheet A stays in the image readout unit 60 for a long time in image readout operation, then the next stimulable phosphor sheet A delivered by the belt conveyors 54, 56 may be temporarily held in the stacker 57 in preparation for a next cycle of image readout operation.

The stimulable phosphor sheet A fed from the belt conveyors 54, 56 is delivered via the belt conveyor 58 to the belt conveyor 62. The belt conveyor 62 then delivers the stimulable phosphor sheet A in the subscanning direction, indicated by the arrow, while the stimulable phosphor sheet A is being held in position under vacuum by the vacuum suction mechanism (not shown) against unwanted displacement. At this time, the laser beam L is emitted from the light source 60 and reflected by the mirror 62 to the galvanometer mirror 64, which is angularly moved at a high speed to deflect the laser beam L in the main scanning direction, thus scanning the stimulable phosphor sheet A with the laser beam L in the main scanning direction. Thus, the stimulable phosphor sheet A is two-dimensionally scanned. Upon exposure to the laser beam L, the stimulable phosphor sheet A emits light commensurate with the recorded radiation image. The emitted light directly enters the light guide 68 through the entrance end thereof or is reflected by the reflecting mirror 66 into the entrance end of the light guide 68, and is guided by the inner walls of the light guide 68 to reach the photomultiplier 70. The photomultiplier 70 converts the light from the light guide 68 into an electric signal which is processed in the same manner as described with reference to FIG. 1.

The stimulable phosphor sheet A from which the image has been read is delivered from the belt conveyor 62 onto the belt conveyor 72, and then is conveyed onto the guide 74. At this time, the erasure light sources 78 are energized to apply erasing light to the stimulable phosphor sheet A for erasing any remaining radiation image from the stimulable phosphor sheet A.

Thereafter, the stimulable phosphor sheet A is fed by the belt conveyor 80 into an upper portion of the housing 32. The guide plates 84a through 84c are selectively actuated dependent on the side of the stimulable phosphor sheet A as it is conveyed by the belt conveyor 80. As a result, the stimulable phosphor sheet A is delivered into one of the trays 86a through 86d dependent on the side of the sheet A.

Stimulable phosphor sheets A thus stored in one of the trays 86a through 86d are then picked up successively by the corresponding one of the suction cups 88a through 88d, and delivered by the corresponding one of the belt conveyors 92a through 92d. Each stimulable phosphor sheet A is then conveyed by the belt conveyor 90 to the auxiliary erase unit 100, in which the erasure light source 102 is energized to erase any remaining image from the stimulable phosphor sheet A. More specifically, the stimulable phosphor sheets A usually remain stacked in the trays 86a through 86d for a considerable period of time after remaining images have been erased therefrom in the erase unit 76. Even if such a remaining image is erased from the stimulable phosphor sheet A in the erase unit 76, radiation energy may be stored again in the stimulable phosphor sheet A by radiation emitted from a radioactive isotope such as $^{226}R$, $^{40}K$, or the like contained in a small quantity in the stimulable phosphor or by environmental radiation rays such as a cosmic ray, an X-ray from another X-ray source, and the like, after a certain period of time has elapsed. Such stored radiation energy may come out as noise when a next image is recorded on the stimulable phosphor sheet A. To prevent such noise from being produced, the stimulable phosphor sheet A is exposed to erasing light emitted from the erasure light source 102 in the auxiliary erase unit 100. The stimulable phosphor sheet A after such secondary image erasure has been effected is delivered by the belt conveyor 96 to the loading unit 98. At this time, another cassette 200 containing no stimulable phosphor sheets A is loaded in the loading unit 98. The loading unit 98 may have a member having the same tapered surfaces 48a, 48b as those of the cassette holder 40, so that the lid members 208a, 208b of the cassette 200 loaded in the loading unit 98 can remain open to allow the stimulable phosphor sheet A from the belt conveyor 96 to be easily fed into the cassette 200.

The cassette 200 with the stimulable phosphor sheet A stored therein is then forcibly removed from the loading unit 98, whereupon the lid members 208a, 208b are brought into pressed contact with each other under the forces of the coil springs 214a, 214b to keep the stored stimulable phosphor sheet A under light-shielding conditions in preparation for a next cycle of recording a desired radiation image.

Instead of loading the cassette 200 in the cassette holder 40, a stack of stimulable phosphor sheets A may be loaded in the sheet storage magazine holder 110. In such a case, the stimulable phosphor sheets A are obliquely held by the tray 112, and successively delivered by the rollers 116 and the belt conveyor 118 onto the belt conveyor 58, from which the stimulable phosphor sheets A are fed to and processed one by one in the image readout unit 60 for image readout operation.

The cassette holder 40, the image readout unit 60, the erase unit 76, and the other units are not limited to the illustrated disposition. Any of various mechanisms may be selected for allowing a stimulable phosphor sheet to drop by gravity from a cassette held in the cassette holder 40 by opening the lower end of the cassette. The principles of the present invention primarily reside in that a sheet is taken out of a cassette by gravity and a recorded image is read and any remaining image is erased from such a sheet gravity-fed from the cassette. Therefore, the sheet after the remaining image has been erased therefrom may be processed in any desired manner; for example, it may immediately be removed directly from the apparatus.

Figure 5:
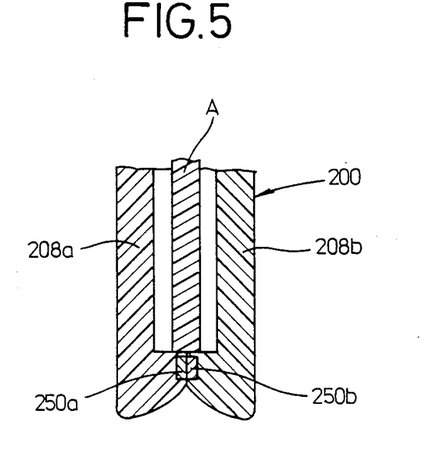
FIG. 5 is a fragmentary vertical cross-sectional view of a cassette according to another embodiment of the present invention.

FIG. 5 shows another embodiment of the cassette 200. The cassette 200 has a pair of lid members 208a, 208b with respective plate-shaped magnets 250a, 250b mounted on their surfaces to be held together. When the cassette 200 is not loaded in the cassette support base 44, the magnets 250a, 250b are magnetically attracted to each other to put the lid members 208a, 208b together for keeping the stimulable phosphor sheet A securely under light-shielding conditions.

Figure 6:
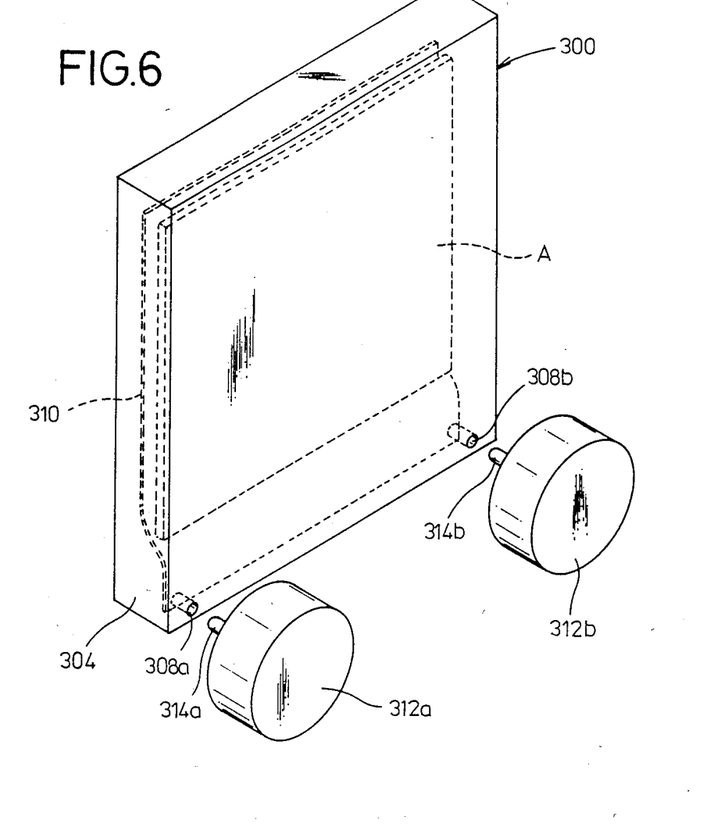
FIG. 6 is a perspective view of a cassette according to still another embodiment of the invention and solenoids employed for opening the lower end of the cassette.
Figure 7:
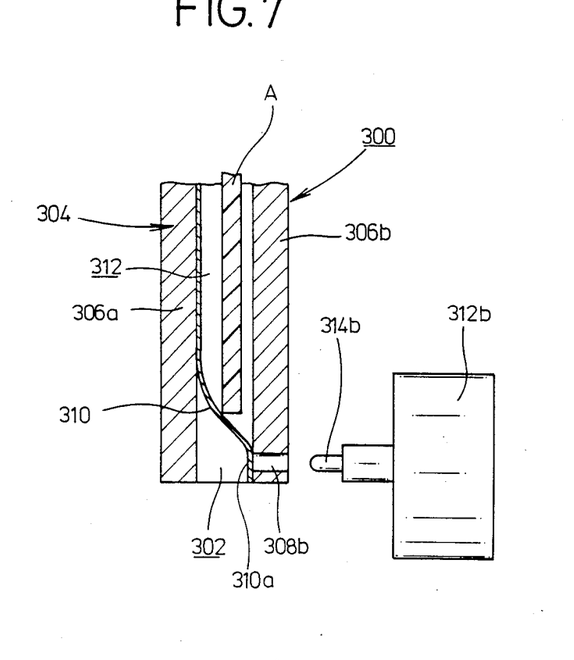
FIG. 7 is a fragmentary vertical cross-sectional view showing the positional relationship between the opening of the cassette of FIG. 6 and one of the solenoids.

An image recording carrier cassette according to still another embodiment of the present invention will be described with reference to FIGS. 6 through 8.

The cassette, generally designated at 300, comprises a casing 304 in the form of a rectangular parallelepiped with an opening 302 defined in a lower end thereof. The casing 304 includes a side wall 306a and another side wall 306b spaced therefrom in confronting relation, the side wall 306b having holes 308a, 308b (FIG. 6) defined therein at the lower end thereof and spaced from each other. A resilient plate 310 of metal is preferably inserted in a chamber 312 defined between the side walls 306a, 306b and defining the opening 302 in its lower end, and has a curved lower distal end portion 310a spanning from the side wall 306a to the side wall 306b, thus closing the opening 302.

The image readout apparatus 30 for receiving the cassette 300 includes a pair of spaced solenoids 312a, 312b facing the side wall 306b and supported on a support plate (not shown) in confronting relation to the holes 308a, 308b, respectively. A cassette support base 44a has a pair of holes 313 (FIG. 8) defined in a lower portion thereof at a spaced interval. The solenoids 312a, 312b have respective pins 314a, 314b held in axial alignment with the holes 308a, 308b, respectively, through the holes 313. Therefore, when the solenoids 312a, 312b are energized, the pins 314a, 314b are moved through the holes 313 into the respective holes 308a, 308b.

In operation, the cassette 300 with the stimulable phosphor sheet A stored therein is loaded through the cassette insertion slot 42 into the image readout apparatus 30. At this time, the stimulable phosphor sheet A with a desired image recorded thereon is retained in the cassette 300 under light-shielding conditions by the lower end portion 310a of the plate member 310 which closes the opening 302 and lies over the holes 308a, 308b. The cassette support base 44a has a pair of tapered surfaces 320a, 320b on its bottom which are slanted downwardly toward each other. When the cassette 300 reaches the tapered surfaces 320a, 320b, the solenoids 312a, 312b are energized. As a consequence, the pins 314a, 314b are moved into the holes 308a, 308b, respectively, to push the lower end portion 310a of the plate 310 off the side wall 306b. As the lower end portion 310a is thus displaced toward the side wall 306a by the pins 314a, 314b, the stimulable phosphor sheet A which has been retained at its lower end by the plate 310 is now fed by gravity through the slit 50 toward the guide plates 52. The stimulable phosphor sheet A will then be processed in the same manner as described with reference to FIG. 2 for the first embodiment of the invention. The cassette 300 is advantageous in that the stimulable phosphor sheet A can be kept under light-shielding conditions simply by the resilient plate 310, and can easily be delivered toward the image readout unit by energizing the solenoids 312a, 312b. The cassette 300 is therefore of a simpler construction.

Figure 9:
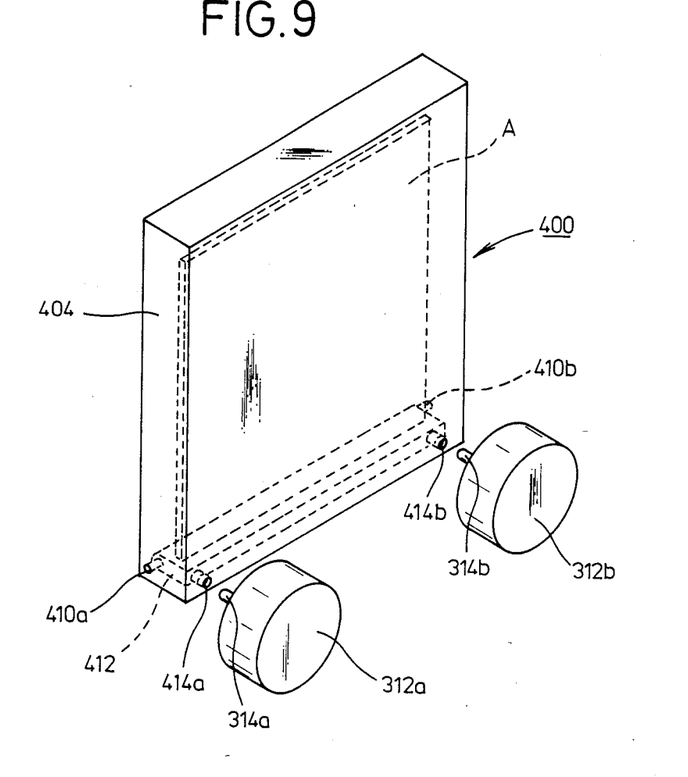
FIG. 9 is a perspective view of a cassette according to a still further embodiment of the invention and solenoids employed for opening the lower end of the cassette.
Figure 10:
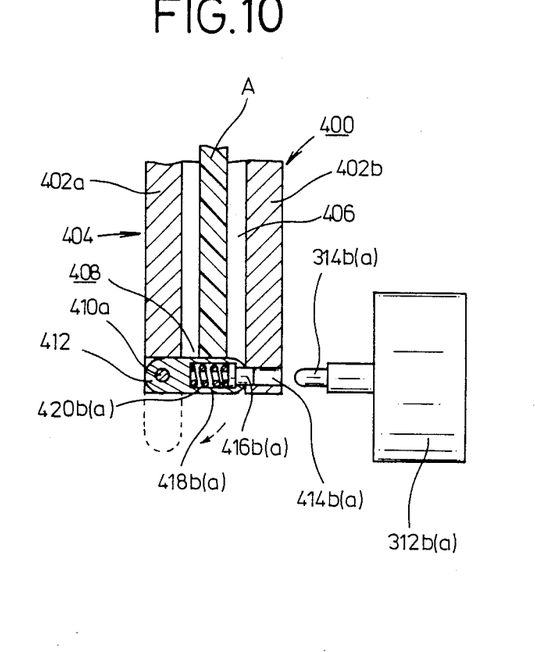
FIG. 10 is a fragmentary vertical cross-sectional view of a lower portion of the cassette shown in FIG. 9.

FIGS. 9 and 10 illustrate a cassette according to a still further embodiment of the present invention. The cassette 400 comprises a casing 404 including first and second side walls 402a, 402b spaced from each other. The casing 404 has a chamber 406 defined between the side walls 402a, 402b for accommodating the stimulable phosphor sheet A, the chamber 406 defining an opening 408 in its lower end. The opening 408 can be closed under light-shielding conditions by a lid member 412 which is pivotally supported at its opposite ends by shafts 410a, 410b in the casing 404.

The side wall 402b has a pair of holes 414a, 414b defined respectively in the opposite ends of a lower end portion thereof. The lid member 412 has a pair of pins 416a, 416b which is normally urged to move into the holes 414a, 414b, respectively, by coil springs 420a, 420b disposed in recesses 418a, 418b, respectively, defined in the longitudinally opposite ends of the lid member 412. The opposite longitudinal edges of the lid member 412 are rounded to permit smooth opening and closing of the lid member 412.

Figure 8:
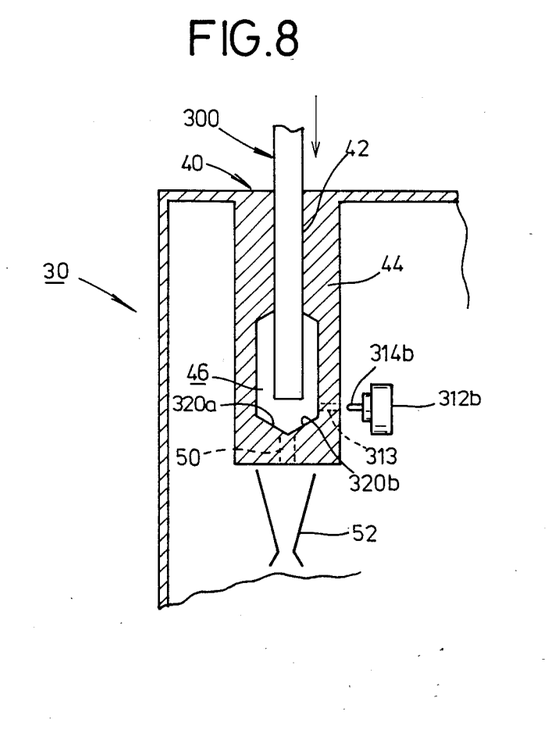
FIG. 8 is a fragmentary vertical cross-sectional view showing the manner in which the cassette of FIG. 6 is loaded in the cassette support base in the radiation image information readout apparatus.

When the cassette 400 is loaded into the cassette holder 40 as shown in FIG. 8, the lower end of the cassette 400 is engaged by the tapered surfaces 320a, 320b. The tapered surfaces 320a, 320b are shaped to provide a space large enough to allow the lid member 412 to be opened therein. Upon energization of the solenoids 312a, 312b, the pins 314a, 314b are inserted into the holes 414a, 414b, respectively, to push the pins 416a, 416b into the lid member 412 against the resiliency of the coil springs 420a, 420b. The lid member 412 is now turned about the axes of the shafts 410a, 410b in the direction of the broken-line arrow to the dotted-line position (FIG. 10). As a result, the stimulable phosphor sheet A which has been retained by the lid member 412 falls by gravity toward the guide plates 52. After the stimulable phosphor sheet A has been delivered toward the image readout unit 30, the cassette 400 can be taken out of the cassette holder 40 for further use.

Figure 11:
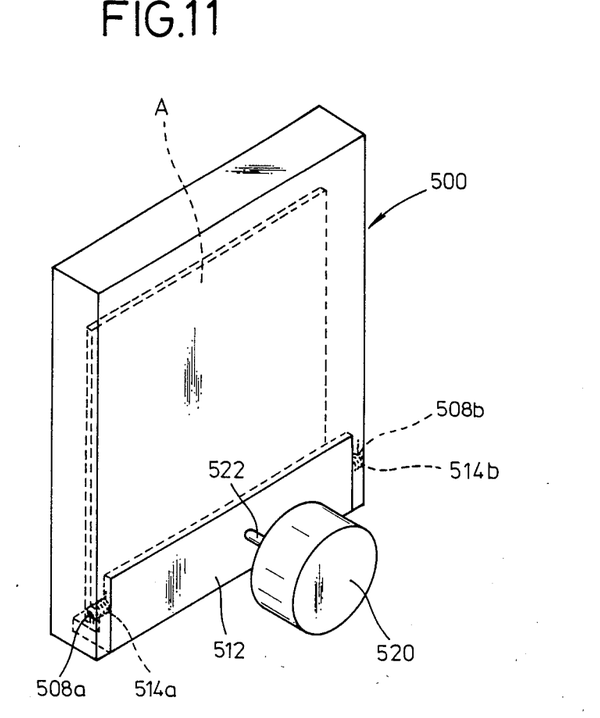
FIG. 11 is a perspective view of a cassette according to another embodiment of the present invention and a solenoid for opening the cassette.
Figure 12:
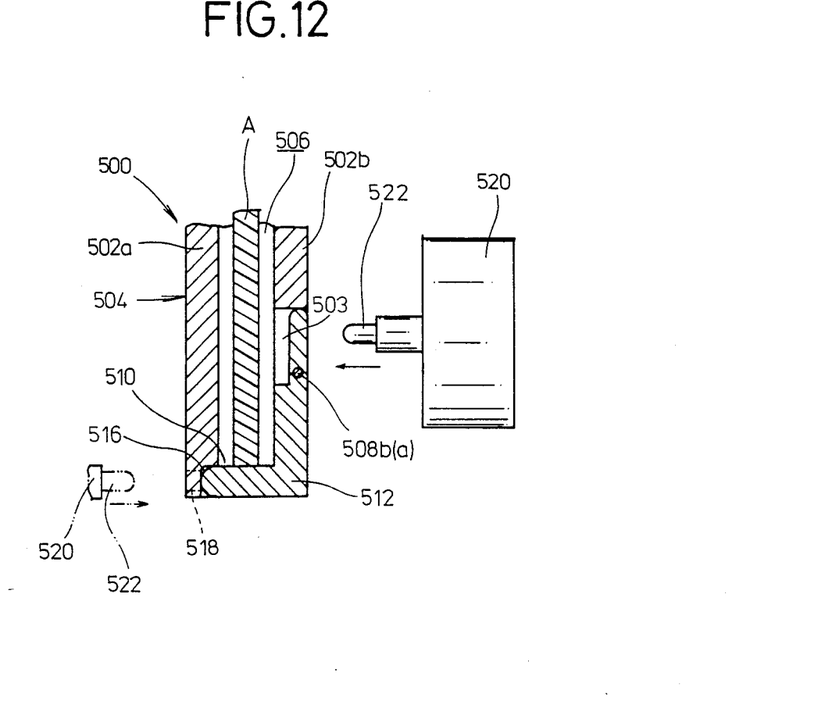
FIG. 12 is a fragmentary vertical cross-sectional view showing the positional relationship between the cassette of FIG. 11 and the solenoid.

A cassette 500 according to another embodiment of the present invention is illustrated in FIGS. 11 and 12. The cassette 500 comprises a casing 504 including first and second side walls 502a, 502b spaced from each other. The casing 504 has a chamber 506 defined between the side walls 502a, 502b for accommodating the stimulable phosphor sheet A. The side wall 502b has a recess 503 defined therein near a lower end thereof, and a lid member 512 of a bent configuration is pivotally disposed in the recess 503 by means of pins 508a, 508b for closing an opening 510 defined in the lower end of the casing 504 in communication with the chamber 506. As shown in FIG. 11, coil springs 514a, 514b are disposed around the pins 508a, 508b, respectively, for normally urging the lid member 512 to close the opening 510. The lid member 512 has a lower horizontal portion with its distal edge normally engaging in a recess 516 defined in the first side wall 502a when the lid member 512 closes the opening 510.

According to the embodiment shown in FIGS. 10 and 11, it is not necessary to employ a plurality of solenoids to actuate the lid member 512. Instead, a single solenoid 520 is positioned substantially centrally of the lid member 12 in its longitudinally direction and located adjacent to the lid member 512. The solenoid 520 has a pin 522 projecting toward the lid member 512 and positioned slightly upwardly of a horizontal line joining the pins 508a, 508b for pushing the lid member 512. When the cassette 500 is inserted through the cassette insertion slot 42 into the cassette support base of the cassette holder 40, the solenoid 520 is energized at the time the cassette 500 reaches a certain position in the cassette support base. The pin 522 is extended into hitting engagement with the upper end portion of the lid member 512 to move the lower distal edge of the lid member 512 out of the recess 516 to open the opening 510 against the resilient forces of the coil springs 514a, 512b around the pins 508a, 508b. Therefore, the stimulable phosphor sheet A drops by gravity from the chamber 506 toward the guide plates 52.

Alternatively, the first side wall 502a may have a hole 518 defined in a lower end thereof as indicated by the broken lines in FIG. 12, and the solenoid 520 may be positioned such that the pin 522 is aligned with the hole 518 as indicated by the imaginary lines. In this alternative arrangement, energization of the solenoid 520 causes the pin 522 to enter the hole 518 and push the distal edge of the horizontal portion of the lid member 512, with the result that the lid member 512 is angularly moved about the pins 508a, 508b to open the opening 510, through which the stimulable phosphor sheet A falls by gravity.

Figure 13A:
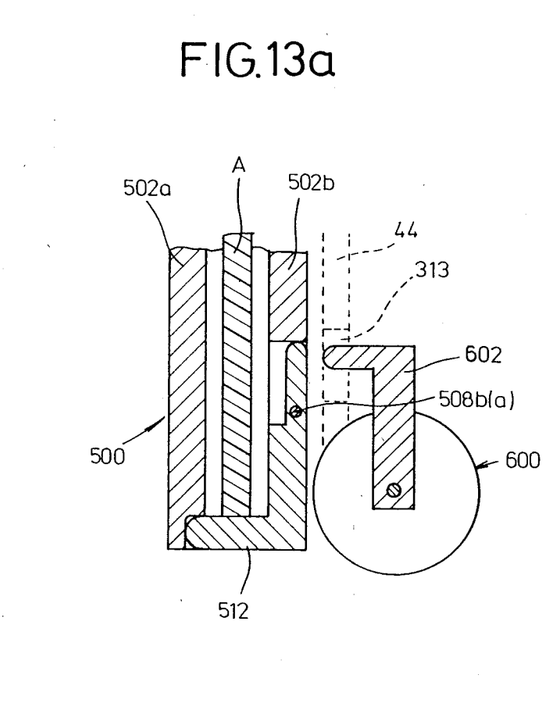
FIGS. 13a and 13b are fragmentary vertical cross-sectional views showing the manner in which the lower end of a cassette according to still another embodiment of the invention is opened by a rotary actuator.
Figure 13B:
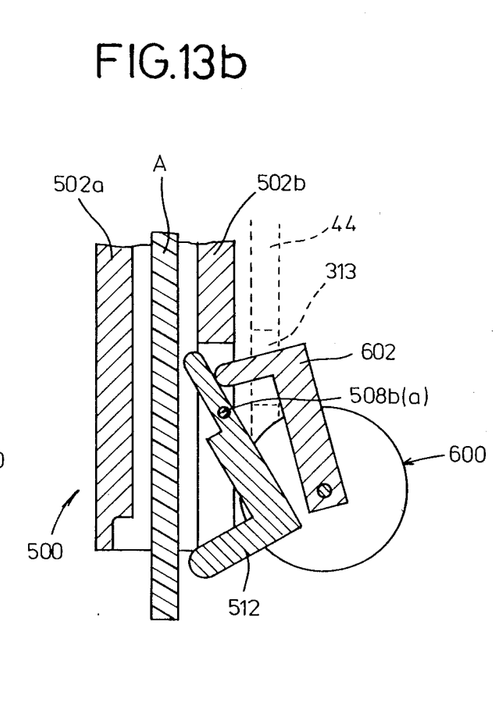

FIGS. 13a and 13b show still another embodiment of the present invention. Those parts in FIGS. 13a and 13b which are identical to those of FIGS. 11 and 12 are denoted by identical reference characters.

In this embodiment, a rotary actuator 600 is employed in place of the solenoid 520 shown in FIGS. 11 and 12, the rotary actuator 600 having a swing arm 602. When the cassette 500 is loaded into the cassette holder, the rotary actuator 600 is energized to turn the swing arm 602 which pushes the lid member 512 about the pins 508a, 508b angularly from the position of FIG. 13a to the position of FIG. 13b. The swing arm 602 therefore opens the lid member 512 by pushing the upper end portion of the lid member 512. The stimulable phosphor sheet A now falls by gravity out of the cassette 500. As an alternative, a link mechanism may be employed in place of the rotary actuator 600, the link mechanism including a link for pushing and opening the lid member 512 upon operation of the link mechanism.

In the image readout apparatus according to the present invention, as described above, a sheet can reliably be removed by gravity feed from a cassette loaded in a cassette holder. Therefore, any suction means which has heretofore been employed for attracting and taking a sheet out of the cassette is not necessary, and the apparatus is simpler in construction. As a consequence, no space for such suction means to deliver the sheet needs to be provided in the apparatus housing. Since the cassette can well be opened and closed within a relatively small space, the apparatus is smaller in size.

The gravity feed of the sheet, rather than the use of suction means, is less susceptible to malfunctioning, and hence the apparatus is more reliable in operation. Tee sheet with desired image information recorded thereon can be held under light-shielding conditions by the cassette of quite a simple structure, and hence can be handled with ease. The simple sheet cassette can be manufactured inexpensively.

The principles of the present invention are not limited to the illustrated image readout apparatus, but also applicable to an image recording apparatus in which an unexposed film is loaded in a cassette and then removed therefrom, and image information previously retrieved from a stimulable phosphor sheet and recorded on a magnetic tape or other medium is recorded on the film by a laser beam. In such an application, an automatic image developing mechanism is disposed in the vicinity of an exposure recording mechanism, and the recorded image can be developed by the exposure recording mechanism.

Although certain preferred embodiments have been shown and described, it should be understood that many changes and modifications may be made therein without departing from the scope of the appended claims.

What is claimed is:

1. A cassette for storing an image recording carrier, comprising:
   a casing for holding the image recording carrier therein under light-shielding conditions;
   a least one lid member mounted on one end of said casing; and
   means for holding said at least one lid member so as to close said casing and maintain said light shielding conditions, wherein said casing comprises a pair of confronting side walls defining an opening therebetween, said at least one lid member including first and second lid members pivotally mounted on said side walls, respectively, for opening movement away from each other, said holding means comprising means for holding said first and second lid members in contact with each other to keep the image recording carrier in said casing under the light-shielding conditions, such that, under said force applied against said holding means, said first and second lid members are separated from each other and the image recording carrier falls out of said cuasing through said opening.

2. A cassette according to claim 1, wherein said holding means comprises plate-shaped magnets mounted respectively on the engageable portions of said first and second lid members to each other to close said opening.

3. A cassette for storing an image recording carrier, comprising:
   a casing for holding the image recording carrier therein under light-shielding conditions;
   at least one lid member mounted on one end of said casing; and
   means for holding said at least one lid member so as to close said casing and maintain said light shielding conditions;
   wherein said casing comprises a pair of confronting side walls defining an opening therebetween, said at least one lid member being bent at an angle and being pivotally mounted on one of said side walls by shafts, said at least one lid member including a horizontal portion for normally closing said opening to keep the image recording carrier in said casing under the light-shielding conditions, such that, under force applied against said holding means, said at least one lid member is opened by pressing against said at least one lid member at a position above said shafts, so as to open said opening, the image recording carrier falling out of said casing through said opening.

4. A cassette according to claim 3, wherein said casing comprises two side walls, said at least one lid member being pivotally mounted on one of said side walls, said at least one lid member having a pin retained therein, said holding means comprising a resilient member retained within said at least one lid member for normally urging said pin in a direction to project out of said at least one lid member, the other side wall having a hole defined therein, said pin being engaged in said hole when said at least one lid member is closed, such that, under force applied against said resilient member to push said pin out of said hole, said at least one lid member is opened, such that the image recording carrier falls out of said casing.

5. A cassette for storing an image recording carrier, comprising:
   a casing for holding the image recording carrier therein under light-shielding conditions;
   at least one lid member mounted on one end of said casing; and
   means for holding said at least one member so as to close said casing and maintain said light shielding conditions;
   wherein said casing comprises a pair of confronting side walls defining an opening therebetween, said at least one lid member being bent at an angle and pivotally mounted on one of said side walls by shafts, the other side wall having a recess, said at least one lid member including a horizontal portion normally urged by said holding means to cause an end thereof to fit in said recess, such that, under force applied against said holding means, said at least one lid member is opened by pushing said end of the horizontal portion out of said recess, so as to open said opening, the image recording carrier falling out of said casing through said opening.

6. A cassette for storing an image recording carrier, comprising:
   a casing for holding the image recording carrier, said casing having a pair of side walls defining therebetween an opening for delivering the image recording carrier therethrough into an apparatus for processing the image recording carrier;
   means, extending from one of said side walls to the other side wall, for normally closing said opening to keep the image recording carrier in said casing under the lightshielding conditions, said normally closing means comprising a resilient plate, positioned such that, under a force applied against said resilient plate, a portion of said resilient plate is pushed so as to open said opening, the image recording carrier falling out of said casing through said opening.

7. A cassette according to claim 6, wherein said resilient plate comprises a resilient plate of metal.

8. A cassette according to claim 7, wherein said other side wall has at least one hole close to a lower end of said resilient plate, such that said opening is opened by applying said force against said resilient plate through said hole to flex said resilient plate off said other side wall.

9. A mechanism for removing an image recording carrier, comprising:
   means defining an opening for vertically downwardly receiving a casing with the image recording carrier stored therein under light-shielding conditions, said casing having a lid member and holding means for normally urging said lid member to close said casing; and
   lid opening means disposed in a lower portion of said opening for applying a force against said holding means so as to forcibly open said lid member, the image recording carrier being delivered out of the casing, wherein said lid-opening means comprises an upwardly-directed tapered projection disposed on a bottom of said opening, said tapered projection having a slit for passage of the image recording carrier downwardly therethrough.

10. A mechanism according to claim 9, wherein said lid-opening means further comprises a solenoid for pushing one end of said lid member.

11. A mechanism according to claim 9, wherein said lid-opening means further comprises a rotary actuator for pushing one end of said lid member.

12. An apparatus for reading an image from a stimulable phosphor sheet, comprising:
   an image readout unit for reading radiation image information recorded on the stimulable phosphor sheet;
   an erase unit for erasing a remaining radiation image on the stimulable phosphor sheet after the radiation image information has been read therefrom;
   a cassette holder for detachably holding a cassette with said stimulable phosphor sheet stored therein, said cassette having an openable and closable end and means for retaining said cassette in a normally closed state, said stimulable phosphor sheet falling by gravity from said cassette when said end of the cassette is opened;
   means for providing a force against said retaining means, to open said cassette; and
   sheet conveyor means for receiving the stimulable phosphor sheet that has fallen from said cassette and delivering the stimulable phosphor sheet to said image readout unit and said erase unit, said cassette holder being disposed above said sheet conveyor means so that said cassette releases said stimulable phosphor sheet in a vertical orientation, and said sheet conveyor means receives said stimulable phosphor sheet in said vertical orientation.

13. An apparatus according to claim 12, further including a housing having a loading unit for loading an empty cassette, and a sheet conveyor system for introducing a stimulable phosphor sheet from which an image has been read or on which an image has been recorded into said loading unit.

14. An apparatus according to claim 13, wherein said loading unit holds the empty cassette at such an angle as to allow the stimulable phosphor sheet delivered by said sheet conveyor system to be introduced by gravity into said empty cassette.

* * * * *